(12) United States Patent
Kleinau et al.

(10) Patent No.: US 6,647,329 B2
(45) Date of Patent: Nov. 11, 2003

(54) DAMPING OF VOLTAGE-CONTROLLED BRUSHLESS MOTORS FOR ELECTRIC POWER STEERING SYSTEMS

(75) Inventors: Julie A. Kleinau, Bay City, MI (US); Ashok Chandy, Fenton, MI (US)

(73) Assignee: Delphi Technologies, Inc., Troy, MI (US)

(*) Notice: Subject to any disclaimer, the term of this patent is extended or adjusted under 35 U.S.C. 154(b) by 71 days.

(21) Appl. No.: 09/829,311

(22) Filed: Apr. 9, 2001

(65) Prior Publication Data

US 2001/0047233 A1 Nov. 29, 2001

Related U.S. Application Data

(60) Provisional application No. 60/195,891, filed on Apr. 7, 2000.

(51) Int. Cl.[7] .................................................. G06F 7/00
(52) U.S. Cl. ......................................................... 701/41
(58) Field of Search .................. 701/41, 42; 180/442, 180/443, 446, 412; 318/254, 448, 461, 718, 802, 632, 432, 434, 138, 139

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kuhnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,660,671 A | 4/1987 | Behr et al. | 180/142 |
| 4,664,211 A | 5/1987 | Oshita et al. | 180/142 |
| 4,686,437 A | 8/1987 | Langley et al. | 318/254 |
| 4,688,655 A | 8/1987 | Shimizu | 180/79.1 |
| 4,745,984 A | 5/1988 | Shimizu | 180/79.1 |
| 4,800,975 A | 1/1989 | Oshita et al. | 180/142 |
| 4,814,677 A | 3/1989 | Plunkett | 318/254 |
| 4,835,448 A | 5/1989 | Dishner et al. | 318/254 |
| 4,837,692 A | 6/1989 | Shimizu | 364/424.05 |
| 4,868,477 A | 9/1989 | Anderson et al. | 318/696 |

(List continued on next page.)

Primary Examiner—Yonel Beaulieu
(74) Attorney, Agent, or Firm—Michael D. Smith

(57) ABSTRACT

An electric power steering system includes a steering wheel, a voltage-controlled electric assist motor connected to the steering wheel or column, and an electronic controller electrically connected to the assist motor that receives a first signal representing a torque command to the assist motor and a second signal representing an angular velocity of the assist motor, and produces a voltage signal according to an assist-dependent damping function of the first and second signals, and uses the voltage signal to control the voltage-controlled electric assist motor in response to the assist-dependent damping function.

20 Claims, 6 Drawing Sheets

U.S. PATENT DOCUMENTS

| | | | |
|---|---|---|---|
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,988,273 A | 1/1991 | Faig et al. | 425/145 |
| 4,992,717 A | 2/1991 | Marwin et al. | 318/696 |
| 5,006,774 A | 4/1991 | Rees | 318/721 |
| 5,040,629 A | 8/1991 | Matsuoka et al. | 180/446 |
| 5,063,011 A | 11/1991 | Rutz et al. | 264/126 |
| 5,069,972 A | 12/1991 | Versic | 428/407 |
| 5,076,381 A | 12/1991 | Daido et al. | 180/79.1 |
| 5,122,719 A | 6/1992 | Bessenyei et al. | 318/629 |
| 5,223,775 A | 6/1993 | Mongeau | 318/432 |
| 5,239,490 A | 8/1993 | Masaki et al. | 364/565 |
| 5,257,828 A | 11/1993 | Miller et al. | 180/79.1 |
| 5,331,245 A | 7/1994 | Burgbacher et al. | 310/186 |
| 5,345,156 A | 9/1994 | Moreira | 318/254 |
| 5,349,278 A | 9/1994 | Wedeen | 318/632 |
| 5,361,210 A | 11/1994 | Fu | 364/424.05 |
| 5,406,155 A | 4/1995 | Persson | 310/68 B |
| 5,428,285 A | 6/1995 | Koyama et al. | 318/799 |
| 5,433,541 A | 7/1995 | Hieda et al. | 400/279 |
| 5,444,341 A | 8/1995 | Kneifel, II et al. | 318/432 |
| 5,460,235 A | 10/1995 | Shimizu | |
| 5,461,293 A | 10/1995 | Rozman et al. | 318/603 |
| 5,467,275 A | 11/1995 | Takamoto et al. | 364/426.01 |
| 5,469,215 A | 11/1995 | Nashiki | 318/432 |
| 5,473,231 A | 12/1995 | McLaughlin et al. | 318/433 |
| 5,475,289 A | 12/1995 | McLaughlin et al. | 318/432 |
| 5,493,200 A | 2/1996 | Rozman et al. | 322/10 |
| 5,504,403 A | 4/1996 | McLaughlin | 318/432 |
| 5,517,415 A | 5/1996 | Miller et al. | 364/424.05 |
| 5,554,913 A | 9/1996 | Ohsawa | 318/434 |
| 5,568,389 A | 10/1996 | McLaughlin et al. | 364/424.05 |
| 5,569,994 A | 10/1996 | Taylor et al. | 318/700 |
| 5,579,188 A | 11/1996 | Dunfield et al. | 360/99.08 |
| 5,585,708 A | 12/1996 | Richardson et al. | 318/800 |
| 5,616,999 A | 4/1997 | Matsumura et al. | 318/632 |
| 5,623,409 A | 4/1997 | Miller | |
| 5,642,044 A | 6/1997 | Weber | 324/207.25 |
| 5,656,911 A | 8/1997 | Nakayama et al. | 318/718 |
| 5,668,721 A | 9/1997 | Chandy | |
| 5,672,944 A | 9/1997 | Gokhale et al. | 318/254 |
| 5,701,065 A | 12/1997 | Ishizaki | 318/701 |
| 5,719,766 A | 2/1998 | Bolourchi et al. | 364/424.052 |
| 5,739,650 A | 4/1998 | Kimura et al. | 318/254 |
| 5,777,449 A | 7/1998 | Schlager | 318/459 |
| 5,780,986 A | 7/1998 | Shelton et al. | 318/432 |
| 5,803,197 A | 9/1998 | Hara et al. | 180/248 |
| 5,811,905 A | 9/1998 | Tang | 310/179 |
| 5,852,355 A | 12/1998 | Turner | 318/701 |
| 5,881,836 A | 3/1999 | Nishimoto et al. | 180/446 |
| 5,898,990 A | 5/1999 | Henry | 29/598 |
| 5,919,241 A | 7/1999 | Bolourchi et al. | 701/41 |
| 5,920,161 A | 7/1999 | Obara et al. | 318/139 |
| 5,929,590 A | 7/1999 | Tang | 318/701 |
| 5,962,999 A | 10/1999 | Nakamura et al. | 318/432 |
| 5,963,706 A | 10/1999 | Baik | 388/804 |
| 5,977,740 A | 11/1999 | McCann | 318/701 |
| 5,984,042 A | 11/1999 | Nishimoto et al. | 180/446 |
| 5,992,556 A | 11/1999 | Miller | |
| 6,002,226 A | 12/1999 | Collier-Hallman et al. | |
| 6,002,234 A | 12/1999 | Ohm et al. | 318/729 |
| 6,009,003 A | 12/1999 | Yeo | 363/37 |
| 6,034,460 A | 3/2000 | Tajima | 310/179 |
| 6,034,493 A | 3/2000 | Boyd et al. | 318/254 |
| 6,043,624 A | 3/2000 | Masaki et al. | 318/723 |
| 6,049,182 A | 4/2000 | Nakatani et al. | 318/432 |
| 6,129,172 A | 10/2000 | Yoshida et al. | 180/446 |

DAMPING OF VOLTAGE-CONTROLLED BRUSHLESS MOTORS FOR ELECTRIC POWER STEERING SYSTEMS

CROSS-REFERENCE TO RELATED APPLICATIONS

This application claims the benefit of U.S. provisional application No. 60/195,891, filed Apr. 7, 2000 the contents of which are incorporated by reference herein in their entirety.

BACKGROUND

In a vehicle equipped with electric power steering ("EPS"), the steering assist may be provided by an electric motor coupled to the steering column or shaft. In order to provide a stable and precise feel to the steering, it is desirable to provide input-dependent damping. An example of such a system is presented in U.S. Pat. No. 5,919,241 ("the '241 patent"), Vehicle Having Electric Power Steering With Active Damping, filed Dec. 13, 1996 and assigned to the assignee of the present application.

The '241 patent shows input-dependent damping of a current-controlled EPS motor capable of actively damping the EPS response at higher vehicle speeds. At lower vehicle speeds, the inherent damping from mechanical and motor control sources was adequate to ensure stability and robustness since the motor controller included a hardware current loop that added damping by slope compensation to ensure stability of the current loop. Slope Compensation is a method well known in the art for stabilizing fixed frequency pulse width modulated closed loop current control, which involves the addition of a negative periodic triangular wave voltage to the reference voltage in the current control circuit. The period of the triangular wave voltage is equal to the pulse width modulation frequency. Slope compensation reduces the peak current allowed as the field-effect transistor ("FET") duty cycles become longer, such as when the motor speed increases.

At higher vehicle speeds, the input-dependent damping algorithm added additional damping to achieve the desired free control response. Excessive amounts of input-dependent damping would have adversely affected the on-center feel and return performance of the EPS system since the damping acts as a brake to slow the system down when returning to center.

Although a current-controlled motor has an inherently controllable torque output, a voltage-controlled brushless motor has an inherently controllable angular velocity ("speed") output instead. A voltage-controlled brushless motor has certain advantages over a current-controlled motor that may be exploited to meet design criteria in an EPS system. Unfortunately, the torque output of a voltage-controlled brushless motor requires a more advanced controller than that required for a current-controlled motor in order to adequately damp the EPS system. Thus, it is desirable to provide at least one of input-dependent and assist-dependent damping of voltage-controlled brushless motors in EPS applications.

SUMMARY

The above described and other features are exemplified by the following Figures and Description in which an electric power steering system is disclosed that includes a steering wheel, a voltage-controlled electric assist motor connected to the steering wheel or steering column, and an electronic controller electrically connected to the assist motor that receives a first signal representing a torque command to the assist motor and a second signal representing an angular velocity of the assist motor, and produces a voltage signal according to an assist-dependent damping function of the first and second signals, and uses the voltage signal to control the voltage-controlled electric assist motor in response to the assist-dependent damping function.

BRIEF DESCRIPTION OF THE DRAWINGS

Referring now to the Figures wherein like elements are numbered alike.

DESCRIPTION OF PREFERRED EMBODIMENTS

Figure 1:
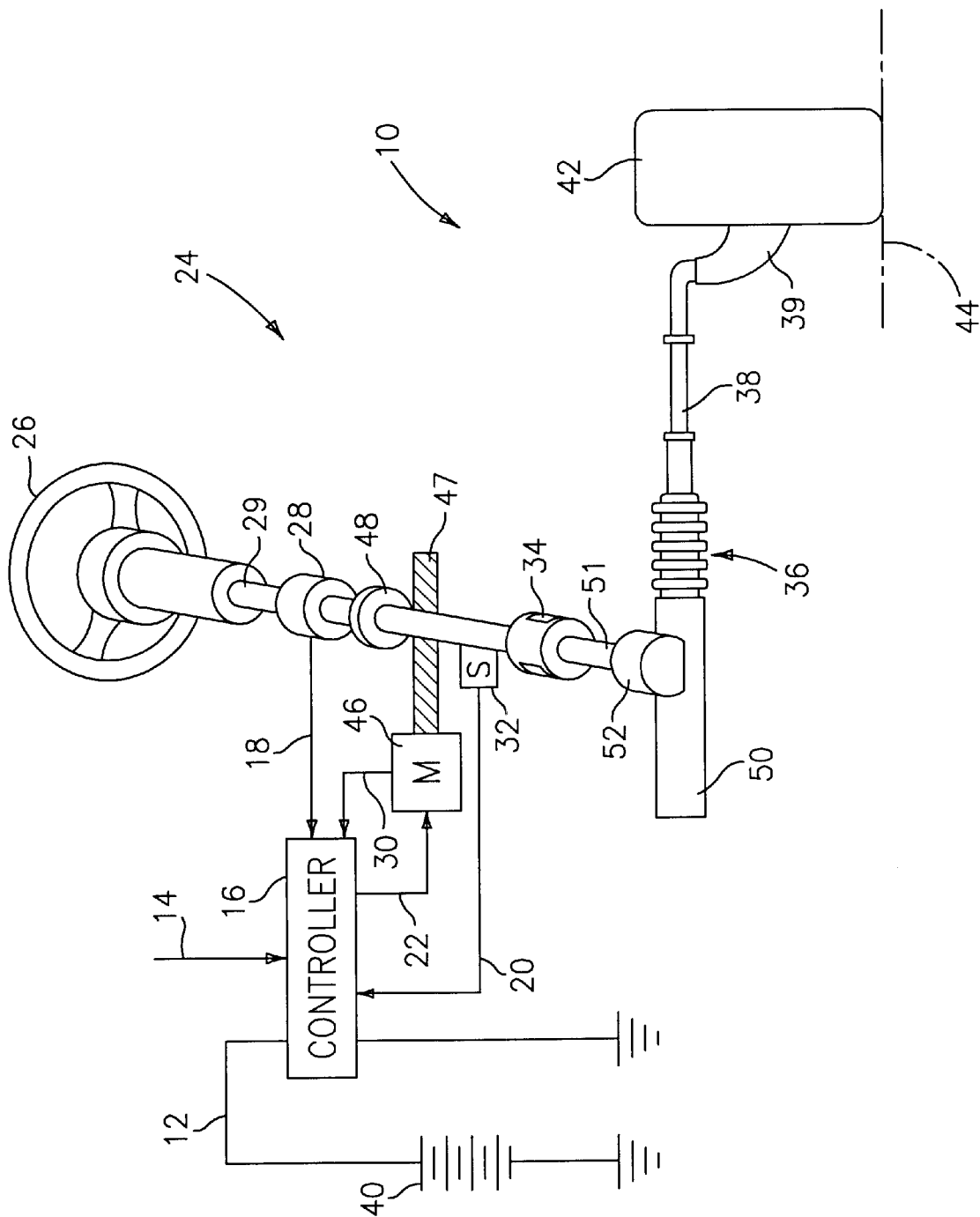
FIG. 1 is a schematic diagram of an electric power steering system having a controller.

Damping is a desirable characteristic for an electric power steering ("EPS") system. In embodiments of U.S. Pat. No. 5,919,241 ("the '241 patent" as introduced above), some damping was provided by the hardware current loop utilizing slope compensation in addition to the damping provided by the motor inductance. In voltage-controlled EPS motors there is no hardware current loop, so alternate means are desirable for accomplishing damping comparable to that available with current-controlled EPS motors.

A voltage command with back electromotive force ("BEMF") compensation control strategy used in voltage-controlled motors does not exhibit damping due to inductance. Without this damping, the system performance is very sensitive to normal parameter variations. Such sensitivity leads to difficulty designing compensators having adequate stability and robustness.

The choice of software damping provides improved robustness to parameter variations and allows for more straightforward compensation control design than BEMF strategies. However, simply using an algorithm of the type shown in the '241 patent does not provide the same quality of damping as a hardware current loop. Drawbacks of such an approach include undesirable quantization of the damping torque due to the software resolution of the torque command to the motor and the velocity input from the motor, wherein unacceptably high quantization error levels in the torque output versus speed for a brushless motor are due to the software commands. The limited resolutions of the motor velocity and the damping torque substantially contribute to this quantization error. This quantization error typically has the undesirable effect of causing the software damping to be ineffective over small changes in motor velocity.

A voltage-controlled motor with or without a phase advance control algorithm has an output resolution of the voltage command that is preferably finer than the output resolution required for current-controlled motors (such as, for example, embodiments of the '241 patent). The finer resolution in output voltage is provided to ensure good torque resolution and low quantization error in the torque output over variations in motor velocity.

Although the resolution requirements for voltage-controlled motors are typically more stringent than for current-controlled motors, which only require damping to eliminate free control, an EPS system incorporating voltage-controlled motors has a high-resolution voltage output that can be leveraged to improve the damping torque resolution. In addition, the value of added damping may be made dependent on the level of assist torque to further increase controllability.

Because a current-controlled motor had more damping, a higher stall torque was required in order to achieve a given torque at the peak power point. With a voltage-controlled motor, one benefit is that the system may be sized for an output torque at the peak power point for the system and does not require a higher output at stall speed, such as would be required in a system having current-control with slope compensation. The peak power point of the system occurs at the knee of the torque versus speed curve, where the downward slope of the curve increases significantly due to the supply voltage limit being reached. The voltage-controlled system has no slope compensation to add damping.

Although BEMF compensation alone, if sufficiently accurate, may allow for a substantially "flat" torque versus speed curve for a voltage-controlled motor with drive electronics, mechanical and magnetic viscous damping will still provide a small slope. However, this level of damping performance, which has advantages for on-center feel and return performance, is substantially less than a current-controlled system, and therefore has the undesirable effect of a poorly damped system response under high loads. This is especially noticeable on steering column direction reversals, where a steering column resonance mode may be briefly excited. This is felt in the vehicle as a vibration or rumble in the corner, or as an increased inertial feel for on-center reversals. In order to enhance system stability, more damping is required.

An embodiment of the present algorithm allows for an additional damping value to be added to the system. Instead of being a constant over assist level, the amount of damping can be changed versus assist level to provide for larger values of damping at higher assist torques, and lesser or no extra damping at low assist torques (such as encountered on-center) in order to prevent returnability and on-center feel from being adversely affected. Thus, the assist dependent damping level is varied with assist level to provide greater damping at the higher system gains that occur when the assist level is high. The system gain is substantially reduced at low assist levels, which results in a reduced assist dependent damping level for low assist levels. This is desirable since at high assist torques corresponding to high system gains, the system stability is more of an issue than on-center feel (high assist torque/high gains are not present on-center). At low assist torques/low system gains, the system stability is less of an issue and on-center feel is more important.

The equations used to control the voltage-controlled brushless motor are listed below.

The following represent the voltage command to the motor:

$$V = T_c K1 + \omega_m K2 \quad (1)$$

where V is the line-to-line peak voltage, $T_c$ is the torque command, $\omega_m$ is the motor mechanical velocity, and K1 and K2 are functions of at least one of motor mechanical velocity $\omega_m$ and phase advance angle $\delta$. All parameters may be expressed in SI units. The $\omega_m$ K2 term represents the back electromotive force ("BEMF") compensation being performed. If BEMF compensation is not desired, the $\omega_m$ K2 term may be eliminated.

One way to add software damping to the output command involves subtracting a quantity corresponding to the damping torque factor B from the torque command $T_c$, and substituting $T_d = T_c - \omega_m B$ in place of $T_c$ in the above equation (1). However since the resultant damped torque command $T_d$ has the same resolution as $T_c$, an unacceptably quantized damping torque results. Either the torque command resolution can be increased, involving rescaling of the algorithm, or the equation can be rearranged as follows:

$$V = (T_c - \omega_m B) K1 + \omega_m K2 \quad (2)$$

$$V = T_c K1 - \omega_m B K1 + \omega_m K2 \quad (3)$$

$$V = T_c K1 + \omega_m (K2 - B K1) \quad (4)$$

Since the resolutions for K1 and K2 are preferably performed at the higher resolution of the voltage command, the generated damping torque is also at the higher resolution. This rearrangement obviates the need for any additional rescaling of the algorithm and results in the torque command resolution being unaffected. There are two versions of the voltage equations that may be used in alternate embodiments of voltage-controlled EPS systems. The first version treats K1 and K2 as interpolated functions of speed, where $\delta$ is a function of speed only. The second version is where K1 and K2 are calculated directly, and $\delta$ is free to be a function of both torque and speed. This same equation rearrangement fits easily into both algorithm structure versions without requiring rescaling.

The resolution of the assist-dependent damping torque is chosen such that stability enhancement due to the added damping is achieved. This will be more stringent than the requirement for input-dependent damping, which typically ranges from about 0.1 Nm/RPM to about 0.5 Nm/RPM at the steering column output shaft. This also requires that the motor velocity resolution be compatible with the maximum range of damping torque allowed by the system embodiment.

The range of damping to be provided is preferably at least as large as the inherent damping in a current-controlled system, typically from about three to about six times that required for input-dependent damping at the steering column output shaft. The tunable range could be larger, such as, for example, comparable to the range for input-dependent damping for a given current-control algorithm. The larger the value of damping required, the finer the resolution requirement for the motor velocity in order to prevent large changes in torque output for small changes in motor velocity. Excessively large values of damping may be undesirable for achieving certain performance criteria, so substantially the smallest damping value necessary to achieve acceptable damping performance is preferably used.

Some embodiments of the present voltage-controlled system make it possible to coordinate input-dependent damping, which is dependent on input torque, with assist-dependent damping, which is dependent on assist torque, as an alternative to adding the two damping values together to form a single damping value.

As shown in FIG. 1, a motor vehicle 10 is provided with an electric power steering ("EPS") system 24. The EPS system 24 may comprise a conventional rack and pinion steering mechanism 36, which includes a toothed rack 50 and a pinion gear (not shown) under a gear housing 52. As a steering input member or wheel 26 is turned, a steered member or upper steering shaft 29 turns a lower steering shaft 51 through a universal joint 34; and the lower steering shaft 51 turns the pinion gear. Rotation of the pinion gear moves the rack 50, which moves a pair of tie-rods 38 (only one shown), which, in turn, move a pair of steering knuckles 39 (only one shown) to turn a pair of road wheels 42 (only one shown).

Electric power assist is provided through a controller 16 and a power assist actuator or electric motor 46. The controller 16 receives electric power from a vehicle electric power source 40 through a line 12, a signal representative of the vehicle velocity on line 14, and steering pinion gear angle from a column or shaft rotational position sensor 32 on line 20. As the steering wheel 26 is turned, a torque sensor 28 senses the torque applied to steering wheel 26 by the vehicle operator and provides an operator torque signal to controller 16 on line 18. In addition, as a rotor of the motor 46 turns, rotor position signals for each phase are generated within motor 46 and provided over lines 30 to the controller 16. In response to the vehicle velocity, operator torque, steering pinion gear angle and rotor position signals received, controller 16 derives desired motor voltages and provides such voltages through lines 22 to motor 46, which supplies torque assist to steering shaft 29, 51 through worm 47 and worm gear 48. If the torque sensor 28 is of the type that requires the upper steering shaft 29 to be separated at the sensor between upper and lower sections allowing some range of rotational independence, both rotational position sensor 32 and worm gear 48 are associated with the lower section of the steering shaft below torque sensor 28, as shown.

Figure 2:
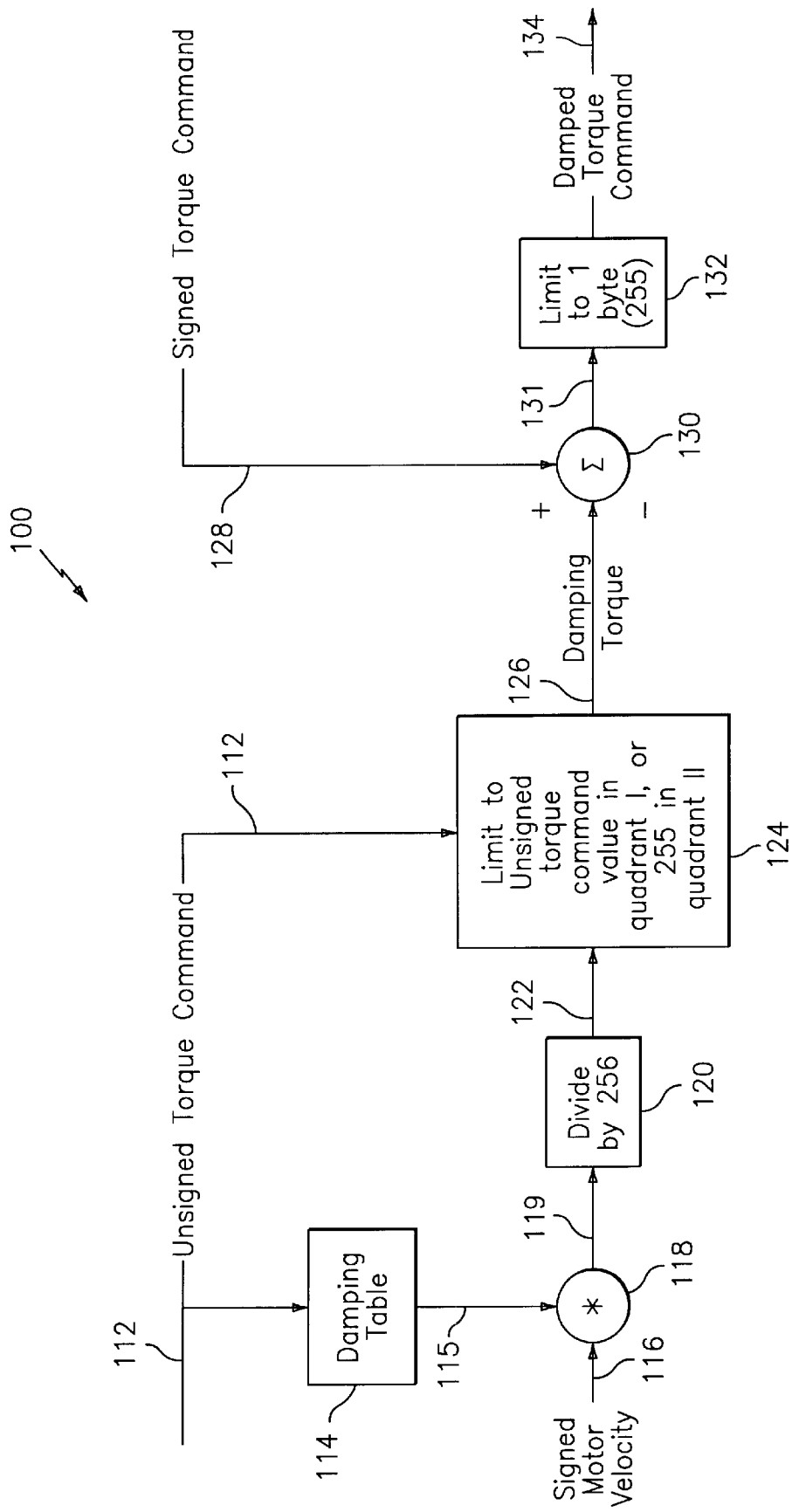
FIG. 2 is a block diagram of a portion of the controller of FIG. 1 having assist-dependent damping.

Turning to FIG. 2, an assist-dependent damping algorithm embodiment is indicated generally by the reference numeral 100. The assist-dependent damping algorithm 100 is implemented by the controller 16 of FIG. 1. The unsigned torque command signal is received on line 112, and used to look up the corresponding damping value from the damping table 114. The looked up damping value is received on line 115, and multiplied by the signed motor velocity signal from line 116 at multiplier 118. In this embodiment, the motor velocity signal $\omega_m$ is determined by differentiating an output of the position sensor 32. However, it is contemplated that alternate embodiments may obtain the motor velocity signal $\omega_m$ from a velocity sensor, such as, for example, a tachometer or a resolver.

The multiplied result of multiplier 118 is received on line 119 and then divided by divider 120. The divided result is received on line 122 and then limited at first limiter 124. The first limiter 124 also receives the unsigned torque command on line 112, and produces a damping torque signal on line 126. The damping torque signal on line 126 is subtracted from a signed torque command received on line 128 by an adder 130. The result from adder 130 is passed via line 131 to a second limiter 132, which limits the value of the result to the maximum value of one storage byte or 255, or whatever size is required for similar embodiments. The value limited by limiter 132 is the damped torque command output on line 134.

Actual sign management may be handled differently due to coding considerations. The limiters prevent the assist-dependent damping algorithm from causing the sign of the torque command to change and thereby cause a braking effect. Where the torque command and the motor speed have opposite signs, it is adequate to limit the damping torque to a single byte value.

The sign of the damping torque signal on line 126 is equal to the sign of the motor velocity signal on line 116. In limiter 124, quadrant I is defined as the motor operating condition where the torque command and the motor speed signals have the same sign, and quadrant II is defined as the motor operating condition where the torque command and the motor speed signals have opposite signs. Quadrant II situations arise on reversals of the steering system. In terms of limiting, the quadrant I and quadrant II information is used to determine which limit is required. If the system is presently operating in quadrant I, then the torque and motor velocity signals have the same sign, and the unsigned torque command is used as the limiting value. If the system is in quadrant II, the torque and velocity signals have opposite signs, and the value of 255 is used as the limit in this embodiment.

The limiter 124 prevents the assist-dependent damping from changing the overall sign of the torque command. However, an alternate embodiment omits part of the first limiter 124 that limited the size of the damping torque to the size of the torque command. The second part of the limiter 124 that implements the hard magnitude limit (255 counts in the specific example in the figure) is retained in this alternate embodiment. The alternate embodiment has the additional advantage that it gives a more linear response than the embodiment with both parts of the limiter 124.

The instruction code for the exemplary embodiment contains the damping table 114, which includes damping values corresponding to various values of torque command. In this exemplary embodiment, the damping values may be further determined using interpolation between particular table values. This damping value is scaled to the steering column output shaft by multiplying the motor damping by each of the assist ratio squared, the assist efficiency, and a constant.

Figure 3:
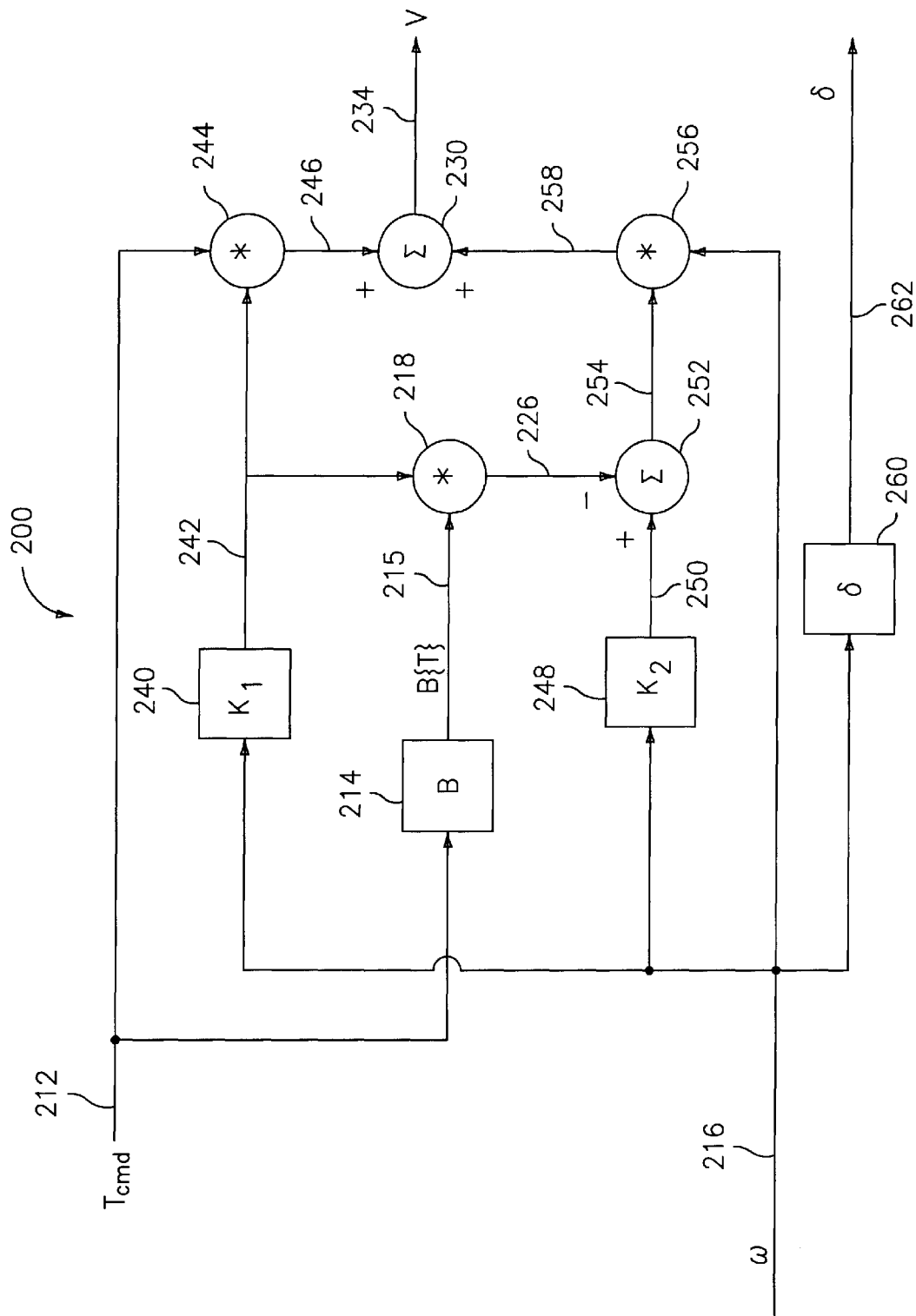
FIG. 3 is a block diagram of an alternate embodiment portion of the controller of FIG. 1 having assist-dependent damping.

Turning now to FIG. 3, an alternate embodiment assist-dependent damping algorithm is indicated generally by the reference numeral 200. The assist-dependent damping algorithm 200 is implemented by the controller 16 of FIG. 1. The torque command signal $T_{cmd}$ is received on line 212 by the B damping function block 214. The damped signal B{T} is fed to line 215. The motor speed signal ω is received on line 216 by $K_1$ function block 240, the output of which is received on line 242. The signal on line 242 is multiplied by the torque command signal $T_{cmd}$ on line 212 by multiplier 244, and output on line 246. The signal on line 242 is separately multiplied by the damped signal on line 215 by a multiplier 218, and output on line 226.

The $K_2$ function block 248 receives the motor speed signal c on line 216, and produces the signal on line 250. The signal on line 226 is subtracted from the signal on line 250 by summing block 252, with the result output to line 254. The signal on line 254 is multiplied by the motor speed signal co on line 216 to produce the signal on line 258. The signals on lines 258 and 246 are added at summing block 230, and output on line 234 as the motor voltage signal V. The motor speed ω on line 216 is also received by δ phase function block 260, with the resulting δ phase signal produced on line 262.

Thus, the voltage output equation for this diagram may be rewritten as follows:

$$V=(T_{cmd}-\omega B\{T_{cmd}\})*K_1\{\omega\}+\omega K_2\{\omega\} \quad (5)$$

$$V=T_{cmd}K_1\{\omega\}-\omega B\{T_{cmd}\}K_1\{\omega\}+\omega K_2\{\omega\} \quad (6)$$

$$V=T_{cmd}K_1\{\omega\}+\omega(K_2\{\omega\}-B\{T_{cmd}\}K_1\{\omega\}) \quad (7)$$

The last equation shows the enhanced damping algorithm used in this embodiment, where $K_1$ and $K_2$ are interpolated functions of motor speed $\omega$. Phase advance $\delta$ is also a function of $\omega$. In addition, the damping value $B\{T_{cmd}\}$ is a function of the assist torque ($T_{cmd}$).

Figure 4:
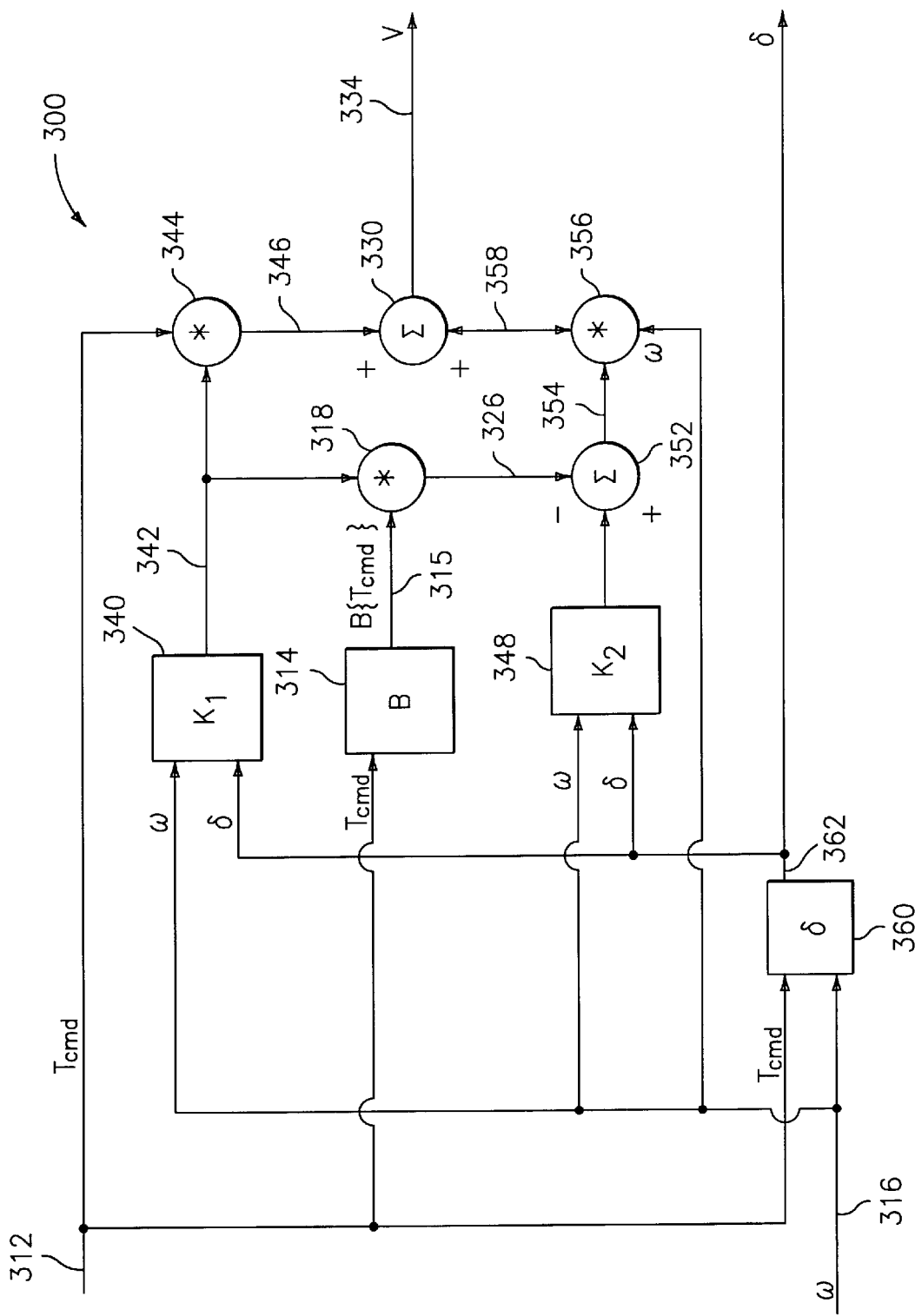
FIG. 4 is a block diagram of another alternate embodiment portion of the controller of FIG. 1 having assist-dependent damping.

As shown in FIG. 4, another assist-dependent damping algorithm embodiment is indicated generally by the reference numeral 300. The assist-dependent damping algorithm 300 is implemented by the controller 16 of FIG. 1. The phase advance $\delta$ function block 360 receives the motor speed $\omega$ on line 316 and the torque command signal $T_{cmd}$ on line 312, with the resulting phase advance signal $\delta$ produced on line 362. The torque command signal $T_{cmd}$ is also received on line 312 by the B damping function block 314, and the damped signal B{T} is fed to line 315. The motor speed signal $\omega$ is further received on line 316 by $K_1$ function block 340, which also receives the phase advance signal $\delta$ on line 362 and produces a signal on line 342. The signal on line 342 is multiplied by the torque command signal $T_{cmd}$ on line 312 by multiplier 344, and output on line 346. The signal on line 342 is separately multiplied by the damped signal on line 315 by a multiplier 318, and output on line 326.

The $K_2$ function block 348 receives the motor speed signal w on line 316 and the $\delta$ phase signal on line 362, and produces the signal on line 350. The signal on line 326 is subtracted from the signal on line 350 by summing block 352, with the result output to line 354. The signal on line 354 is multiplied by the motor speed signal $\omega$ on line 316 at multiplication block 356 to produce the signal on line 358. The signals on lines 358 and 346 are added at summing block 330, and output on line 334 as the motor voltage signal V.

Thus, the enhanced damping value B is a function of assist torque command ($T_{cmd}$), where $K_1$ and $K_2$ are computed functions of speed ($\omega$) and phase advance ($\delta$). Here, phase advance ($\delta$) is a function of both $T_{cmd}$ and $\omega$. In an alternate embodiment, B could be constant if the assist dependent feature were not required.

Figure 5:
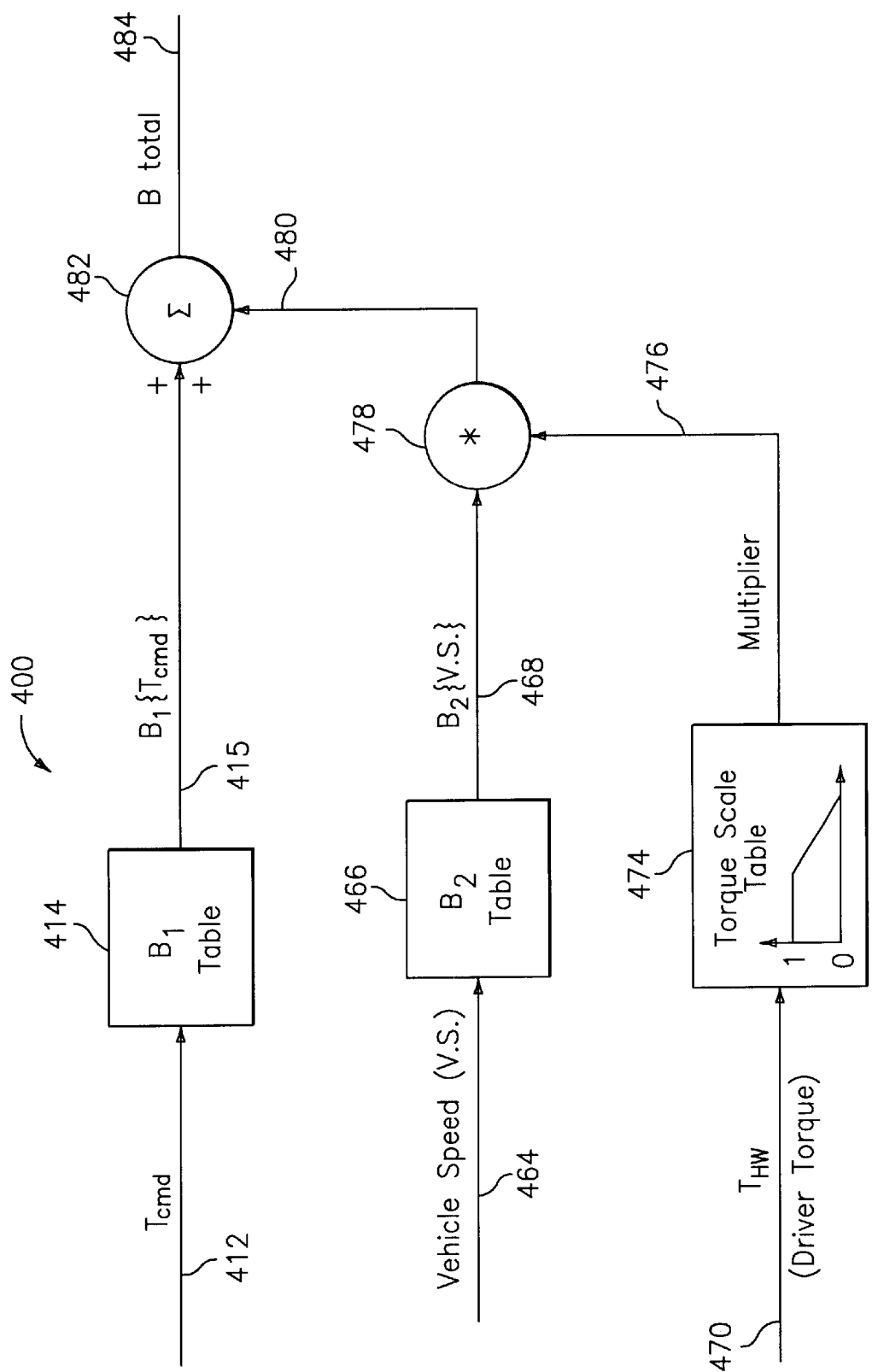
FIGS. 5 and 6 are block diagrams of a portion of the controller of FIG. 1 having assist-dependent damping and input-dependent damping.
Figure 6:
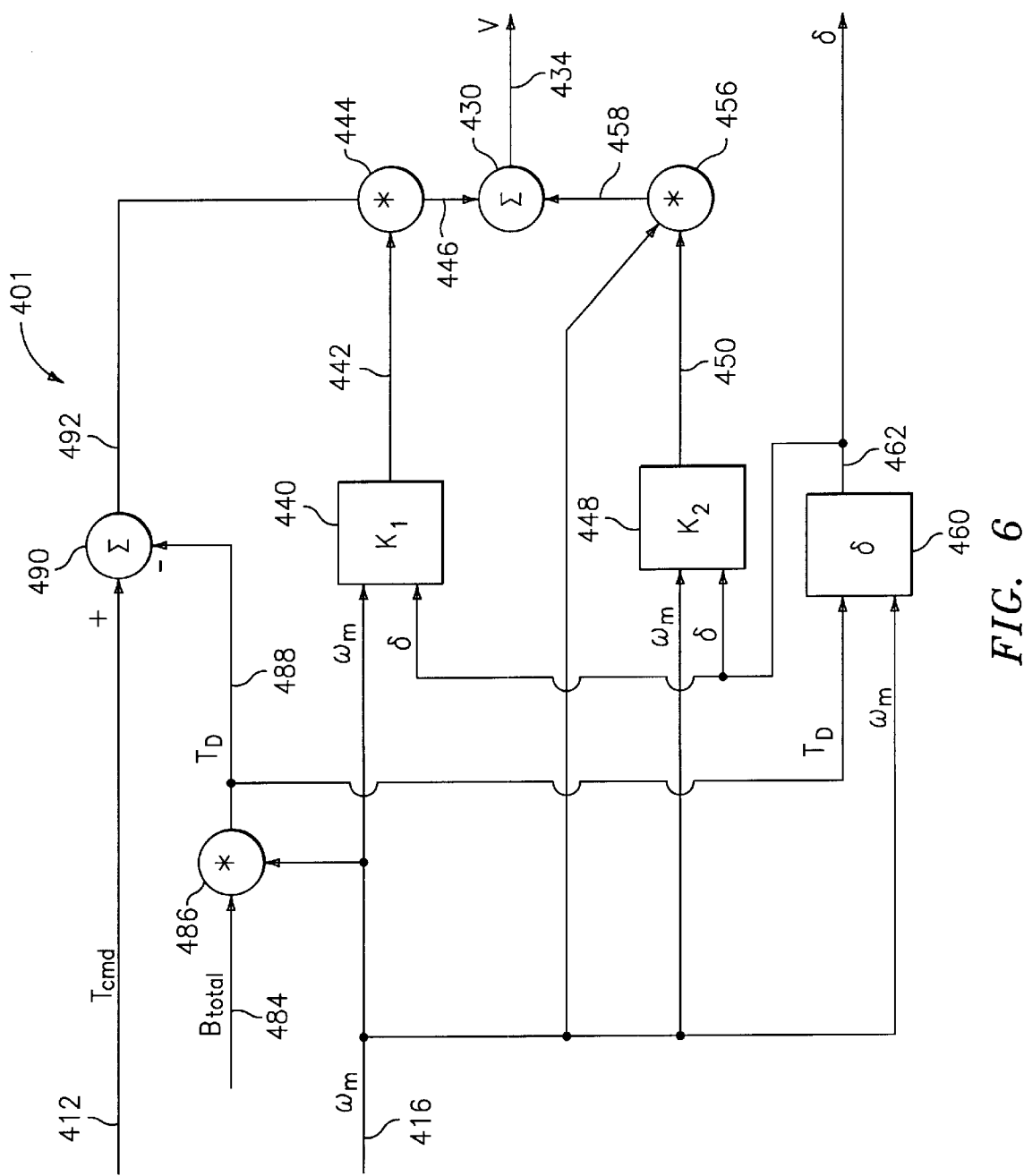

Turning now to FIGS. 5 and 6, an assist-dependent and input-dependent damping algorithm embodiment is indicated generally by the reference numerals 400 and 401. The damping algorithm 400 and 401 is implemented by the controller 16 of FIG. 1. The first portion of the algorithm 400 includes a $B_1$ table 414 and a $B_2$ table 466. The torque command $T_{cmd}$ is received on line 412, and used as an index to look up the corresponding interpolated function value from the B1 table 414. This interpolated looked up value is produced on line 415. A vehicle road speed signal is received on line 464 and used as an index to look up the corresponding interpolated function value from the B2 table 466. This corresponding interpolated looked up value is produced on line 468. The driver hand-wheel torque input $T_{hw}$ is received on line 470 by a torque scale table 474. The torque scale table 474, in turn, produces a multiplier signal on line 476. A multiplication block 478 multiples the signals on lines 476 and 468 to produce a signal on line 480. A summation block 482 adds the signals on lines 480 and 415 to produce a signal on line 484 indicative of the total desired amount of damping, $B_{total}$.

In FIG. 6, a multiplication block 486 receives the $B_{total}$ signal on line 484 and multiplies it with the motor speed signal $\omega_m$ received on line 416 to produce a signal $T_d$ on line 488 indicative of a damped torque command. The torque command signal $T_{cmd}$ is received on line 412 by a summation block 490, which subtracts the signal on line 488 to produce the signal on line 492. The phase advance $\delta$ function block 460 receives the motor speed $\omega$ on line 416 and the damped torque command signal $T_d$ on line 488, with the resulting phase advance signal $\delta$ produced on line 462. The motor speed signal $\omega$ is further received on line 416 by $K_1$ function block 440, which also receives the phase advance signal $\delta$ on line 462 and produces a signal on line 442. The signal on line 442 is multiplied by the signal on line 492 by multiplier 444, and output on line 446.

The $K_2$ function block 448 receives the motor speed signal $\omega$ on line 416 and the $\delta$ phase signal on line 462, and produces a signal on line 450. The signal on line 450 is multiplied by the motor speed signal $\omega$ on line 416 at multiplication block 456 to produce the signal on line 458. The signals on lines 458 and 446 are added at summing block 430, and output on line 434 as the motor voltage signal V.

As shown, the $B_1$ table 414 represents a damping value as a function of assist torque ($T_{cmd}$). This $B_1$ table 414 could also be constant if the assist dependent feature were not required. The $B_2$ table 466 represents the damping required at higher vehicle speeds to provide free control compensation. The torque scale table 474 provides additional scaling on $B_2$. The net effect is to reduce damping at higher driver input torques to allow evasive maneuvers to be performed at lower driver torques.

In alternate embodiments, the damping value $B_{total}$ of FIG. 6 may include all of the elements shown in FIG. 5, or any subset thereof. The rest of the voltage calculations are substantially similar to those of the other embodiments. Thus, in this embodiment the input-dependent damping function is a function of both vehicle road speed and driver torque $T_{hw}$. However, alternate embodiments are contemplated in which the input-dependent damping function is a function of just one of vehicle speed and driver torque, preferably vehicle speed.

Although operating the motor with a hardware current loop could add smooth damping torque to the system, such would defeat the advantages of a voltage-controlled motor. Improving the resolution of the torque command in the algorithm could also add smooth damping torque to the system, but would involve a complete rescaling of the voltage calculation algorithm. In the case where BEMF compensation is being used in a voltage mode controlled system, the BEMF compensation could be scaled down to add "damping" to the system, but this kind of correction gives a non-constant and nonlinear damping torque versus motor speed, so additional corrections would then be necessary. Also, as supply voltage changes in the system, the amount of damping resultant from BEMF scaling would vary, causing undesirable variations in the stability and robustness properties of the system.

Embodiments of the new damping algorithm provide a constant damping torque over both motor speed and supply voltage, and do not require rescaling of any of the torque or voltage path variables presently in the algorithm; thus saving microprocessor resources and lead time. These algorithms may be implemented in either an "interpolated table" embodiment of the algorithm or a direct computational embodiment.

While the invention has been described with reference to exemplary embodiments, it will be understood by those of ordinary skill in the pertinent art that various changes may be made and equivalents may be substituted for elements thereof without departing from the scope of the disclosure. In addition, numerous modifications may be made to adapt the teachings of the disclosure to a particular object or situation without departing from the essential scope thereof. Therefore, it is intended that the claims not be limited to the particular embodiments disclosed as the currently preferred best modes contemplated for carrying out the teachings herein, but that the claims shall cover all embodiments falling within the true scope and spirit of the disclosure.

What is claimed is:

1. An electric power steering system comprising a steering input member, a voltage-controlled electric assist motor coupled to the input member, and an electronic controller in signal communication with the assist motor; the electronic controller comprising:
   a first signal input for receiving a first signal indicative of a torque command to the assist motor;
   a second signal input for receiving a second signal indicative of an angular velocity of the assist motor;
   an assist-dependent damping function responsive to the first and second signal; and
   a signal output for providing a voltage signal in communication with the voltage-controlled electric assist motor;
   wherein the voltage signal is responsive to the assist-dependent damping function.

2. An electric power steering system as defined in claim 1; the electronic controller further comprising:
   a third signal input for receiving a third signal indicative of a road speed of a vehicle; and
   an input-dependent damping function responsive to the third signal;
   wherein the voltage signal is responsive to the input-dependent damping function.

3. An electric power steering system as defined in claim 2, further comprising:
   a steered member coupled to the steering input member; and
   a torque sensor coupled to the steered member for sensing a driver torque input;
   wherein:
      the input-dependent damping function is responsive to the driver torque input; and
      the voltage signal of the electronic controller is responsive to the input-dependent damping function.

4. An electric power steering system as defined in claim 2 wherein the input-dependent damping function is responsive to at least one of the first and second signals.

5. An electric power steering system as defined in claim 2 wherein at least one of the input-dependent damping function and the assist-dependent damping function comprises a look-up table.

6. An electric power steering system as defined in claim 2 wherein at least one of the assist-dependent damping function and the input-dependent damping function comprises a direct computation.

7. An electric power steering system as defined in claim 2 wherein at least one of the assist-dependent damping function and the input-dependent damping function comprises a constant.

8. An electric power steering system comprising a steering input member, a voltage-controlled electric assist motor coupled to the input member, and an electronic controller in signal communication with the assist motor; the electronic controller comprising:
   a first signal input or receiving a first signal indicative of a torque command to the assist motor;
   a second signal input for receiving a second signal indicative of an angular velocity of the assist motor;
   an assist-dependent damping function responsive to the first and second signal; and
   a signal output for providing a voltage signal in communication with the voltage-controlled electric assist motor;
   a phase advance function in signal communication with the assist motor, wherein the phase advance function in responsive to at least one of the first and second signal; and
   wherein the voltage signal is responsive to the assist-dependent damping function.

9. An electric power steering system as defined in claim 2; the controller further comprising a vehicle speed signal wherein at least one of the input-dependent damping function and the assist-dependent damping function is responsive to the vehicle speed signal.

10. An electric power steering system as defined in claim 1 wherein the voltage-controlled electric assist motor is brushless.

11. A method for controlling an electric power steering system comprising a steering input member, a voltage-controlled electric assist motor coupled to the input member, and an electronic controller in signal communication with the assist motor; the method comprising:
    receiving a first signal indicative of a torque command to the assist motor;
    receiving a second signal indicative of an angular velocity of the assist motor;
    computing an assist-dependent damping function responsive to the first and second signals; and
    adapting an output voltage in signal communication with the voltage-controlled electric assist motor in response to the assist-dependent damping function.

12. A method for controlling an electric power steering system comprising a steering input member, a voltage-controlled electric assist motor coupled to the input member, and an electronic controller in signal communication with the assist motor; the method comprising:
    receiving a first signal indicative of a torque command to the assist motor;
    receiving a second signal indicative of an angular velocity of the assist motor;
    computing an assist-dependent damping function responsive to the first and second signals;
    adapting an output voltage in signal communication with the voltage-controlled electric assist motor in response to the assist-dependent damping function;
    adding the first signal to the computed assist-dependent damping function; and
    limiting the added assist-dependent damping function.

13. A method for controlling an electric power steering system comprising a steering input member, a voltage-controlled electric assist motor coupled to the input member, and an electronic controller in signal communication with the assist motor; the method comprising:
    receiving a first signal indicative of a torque command to the assist motor;
    receiving a second signal indicative of an angular velocity of the assist motor;
    computing an assist-dependent damping function responsive to the first and second signal;
    adapting an output voltage in signal communication with the voltage-controlled electric assist motor in response to the assist-dependent damping function;
    limiting the computed assist-dependent damping function; and
    adding the first signal to limited assist-dependent damping function.

14. A method for controlling an electric power steering system as defined in claim 11, further comprising:

receiving a third signal indicative of a vehicular road speed;

computing a first input-dependent damping function responsive to the third signal; and adapting the output voltage in response to the first input-dependent damping function.

15. A method for controlling an electric power steering system comprising a steering input member, a voltage-controlled electric assist motor coupled to the input member, a torque sensor coupled to the steering input member, and an electronic controller in signal communication with the assist motor; the method comprising:

receiving a first signal indicative of a torque command to the assist motor;

receiving a second signal indicative of an angular velocity of the assist motor;

computing an assist-dependent damping function responsive to the first and second signals;

adapting an output voltage in signal communication with the voltage-controlled electric assist motor in response to the assist-dependent damping function;

receiving a third signal indicative of a vehicular road speed;

computing a first input-dependent damping function responsive to the third signal;

adapting the output voltage in response to the fist input-dependent damping function;

receiving a fourth signal indicative of a driver torque input upon the steering input member; computing a second input-dependent damping function responsive to the driver torque input; and adapting the output voltage in response to the second input-dependent damping function.

16. A method as defined in claim 15 wherein adapting the output voltage in response to the second input-dependent damping function comprises multiplying the computed first input-dependent damping function by the computed second input-dependent damping function and adapting the output voltage in response to the product of the multiplication.

17. A method for controlling an electric power steering system as defined in claim 15 wherein at least one of computing an assist-dependent damping function and computing a first input-dependent damping function and computing a second input-dependent damping function comprises:

using at least one of the first, second, third and fourth signals as an index to a look-up table;

looking-up an intermediate result responsive to the at least one signal;

interpolating the intermediate result in response to the difference between the at least one signal and the corresponding table index to compute the at least one damping function.

18. A method for controlling an electric power steering system as defined in claim 15 wherein at least one of computing an assist-dependent damping function and computing a first input-dependent damping function and computing a second input-dependent damping function comprises directly computing the function result.

19. A method for controlling an electric power steering system as defined in claim 15 wherein at least one of computing an assist-dependent damping function and computing a first input-dependent damping function and computing a second input-dependent damping function comprises multiplying by a constant.

20. An electric power steering, system for a vehicle comprising a steering input member, a voltage-controlled electric assist motor coupled to the input member, and an electronic controller in signal communication with the assist motor; the electronic controller comprising:

means for receiving a first signal indicative of a torque command to the assist motor;

means for receiving a second signal indicative of an angular velocity of the assist motor;

means for computing an assist-dependent damping function responsive to the first and second signals;

means for receiving a third signal indicative of a road speed of the vehicle;

means for receiving a fourth signal indicative of a driver torque on the input member;

means for computing an input-dependent damping function responsive to the third and fourth signals; and means for producing an output voltage in signal communication with the assist motor that is responsive to at least one of the assist-dependent damping function and the input-dependent damping function.

* * * * *